United States Patent [19]
Park

[11] Patent Number: 5,643,130
[45] Date of Patent: Jul. 1, 1997

[54] POWER TRAIN OF AN AUTOMATIC TRANSMISSION FOR VEHICLE

[75] Inventor: Donghoon Park, Jeongja-dong, Rep. of Korea

[73] Assignee: Hyundai Motor Company, Seoul, Rep. of Korea

[21] Appl. No.: 515,230

[22] Filed: Aug. 15, 1995

[30] Foreign Application Priority Data

Aug. 18, 1994 [KR] Rep. of Korea ............... 94-20392

[51] Int. Cl.$^6$ ............... F16H 3/00; F16H 37/00
[52] U.S. Cl. ............... 475/204; 475/275; 475/276; 475/277; 475/278; 475/279
[58] Field of Search ............... 475/275, 276, 475/277, 278, 279, 200, 204, 206

[56] References Cited

U.S. PATENT DOCUMENTS 3,613,479  10/1971  Borneman .
4,395,925   8/1983  Gaus ............... 475/278
5,203,749   4/1993  Ito ............... 475/200 X
5,261,861  11/1993  Lemieux ............... 475/276 X

FOREIGN PATENT DOCUMENTS

4339450A1  4/1994  Germany ............... 475/276
56-39346   4/1981  Japan ............... 475/278
59-166749  9/1984  Japan ............... 475/206

*Primary Examiner*—Charles A. Marmor
*Assistant Examiner*—Nathan O. Jensen

[57] ABSTRACT

A disclosed power train of an automatic transmission for a vehicle, which includes a device for making a continuous shifting operation in the low speed region, directly connecting the power train with the output shaft of the engine so as to reduce the shifting shock impulses, and reducing the number of the one-way clutches so as to simplify the whole structure.

29 Claims, 9 Drawing Sheets

FIG.6

| Range | | B1 | B2 | C1 | C2 | C3 | B3 | F2 | Engine Brake |
|---|---|---|---|---|---|---|---|---|---|
| P | | | | | | | | | |
| R | | | O | | | | O | | O |
| N | | | | | | | | | |
| D | 1 | O | | | | | | O | |
| | CV | O | | | O | | | O | |
| | 2 | | | O | | | | O | |
| | 3 | | | O | O | O | | | O |
| III | 1 | O | | | | | | O | |
| | CV | O | | | O | | | O | |
| | 2 | | | O | O | | O | | O |
| II | 1 | O | | | | | | O | |
| | CV | O | | | O | | O | | O |
| L | 1 | O | | | | | O | | O |
| Hold Mode | | O | | | | O | | | O |

POWER TRAIN OF AN AUTOMATIC TRANSMISSION FOR VEHICLE

BACKGROUND OF THE INVENTION

The present invention concerns a power train of an automatic transmission for a vehicle.

Generally, an automatic transmission for a vehicle includes a transmission control unit which automatically controls a plurality of clutches and brakes mounted in a gear train so as to adjust the gear ratio of planetary gears according to the speed and load. While a power train must normally include a compound planetary gear unit and at least five friction elements in order to produce four-forward speed ratio and one-reverse speed ratio, to improve the shifting operation more effectively, a compound planetary gear unit including seven friction elements and three one-way clutches is required. This results in a complicated construction of the power train and an increase of the weight.

Further, the conventional automatic transmission comprises a limited number of shift phases, so that shifting shock impulses unavoidably occur and the speed shifting range is also restricted due to the limited number of the gear ratios, thus making it difficult to achieve the optimum ratio of fuel and power performance. Moreover, the shifting shock impulses frequently occur due to the great input torque and frequent shifting operation in the low speed section. In addition, the input shaft and the gear train must be directly connected with each other in the high speed region in order to make the power transmission efficiency better. But the conventional transmission has no such means.

SUMMARY OF THE INVENTION

It is an object of the present invention to provide a power train of an automatic transmission for a vehicle with means for making a continuous shift operation in the low speed region so as to reduce the shifting shock impulses.

It is another object of the present invention to provide a power train of an automatic transmission for a vehicle which directly connects a gear train with an output end of an engine so as to improve the power transfer efficiency.

It is still another object of the present invention to provide a power train which can simplify the structure of a power train of an automatic transmission for a vehicle by reducing the number of one-way clutches and friction elements.

According to an embodiment of the present invention, a power train of an automatic transmission for a vehicle comprises:

a transmission housing for installing the automatic transmission;

a torque converter for changing the torque speed of the power of the engine;

a shell cover for encasing the torque converter;

a first shift part of a compound planetary gear unit with a first and second simple planetary gear units mounted on an input shaft for carrying out a first shift operation, the first simple planetary gear unit including a first sun gear surrounded by and engaged with a plurality of first pinion gears carried by a first planetary carrier, a first ring gear surrounding and internally engaged with the first pinion gears, and a hub connected with the first ring gear, and the second simple planetary gear unit including a second sun gear surrounded by and engaged with a plurality of second pinion gears carried by a second planetary carrier, and a second ring gear surrounding and internally engaged with the second pinion gears;

a second shift part of a simple planetary gear unit with third and fourth simple planetary gear units for carrying out a second shift operation, the third simple planetary gear unit including a third sun gear surrounded by and engaged with a plurality of third pinion gears carried by a third planetary carrier, and a third ring gear surrounding and internally engaged with the third pinion gears, and the fourth simple planetary gear unit including a fourth sun gear surrounded by and engaged with a plurality of fourth pinion gears carried by a fourth planetary carrier, and a fourth ring gear surrounding and internally engaged with the fourth pinion gears;

a plurality of power transfer members for transferring the power of the engine; and a differential gear for transferring the output of the second shift part to a vehicle axle, wherein the first ring gear is selectively locked by a friction element mounted on the transmission housing to serve as an input or reaction element, the second ring gear is connected with the first sun gear selectively locked by a friction element to serve as an input or reaction element, the first and second pinion gears are connected together via a first power transfer member for transferring the gear shift ratio of the first shift part through a fourth power transfer member, the third ring gear is connected with a fourth power transfer member, the fourth sun gear is connected to receive the output of the third simple planetary gear unit and locked by a clutch to be prevented from rotating in the direction opposite to the rotational direction of the engine, the third sun gear is locked by a friction element serving as a reaction element, and the third simple planetary gear unit is selectively locked by friction element to deliver the same speed as that of the first shift part.

BRIEF DESCRIPTION OF THE DRAWINGS

The present invention will now be described more specifically with reference to the drawings attached only by way of example.

FIG. 6 is a table showing the combination of the working elements of the inventive automatic transmission according to the shifting stages;

The present invention will now be described more specifically with reference to the drawings attached only by way of example.

DETAILED DESCRIPTION OF THE PREFERRED EMBODIMENTS

Figure 1:
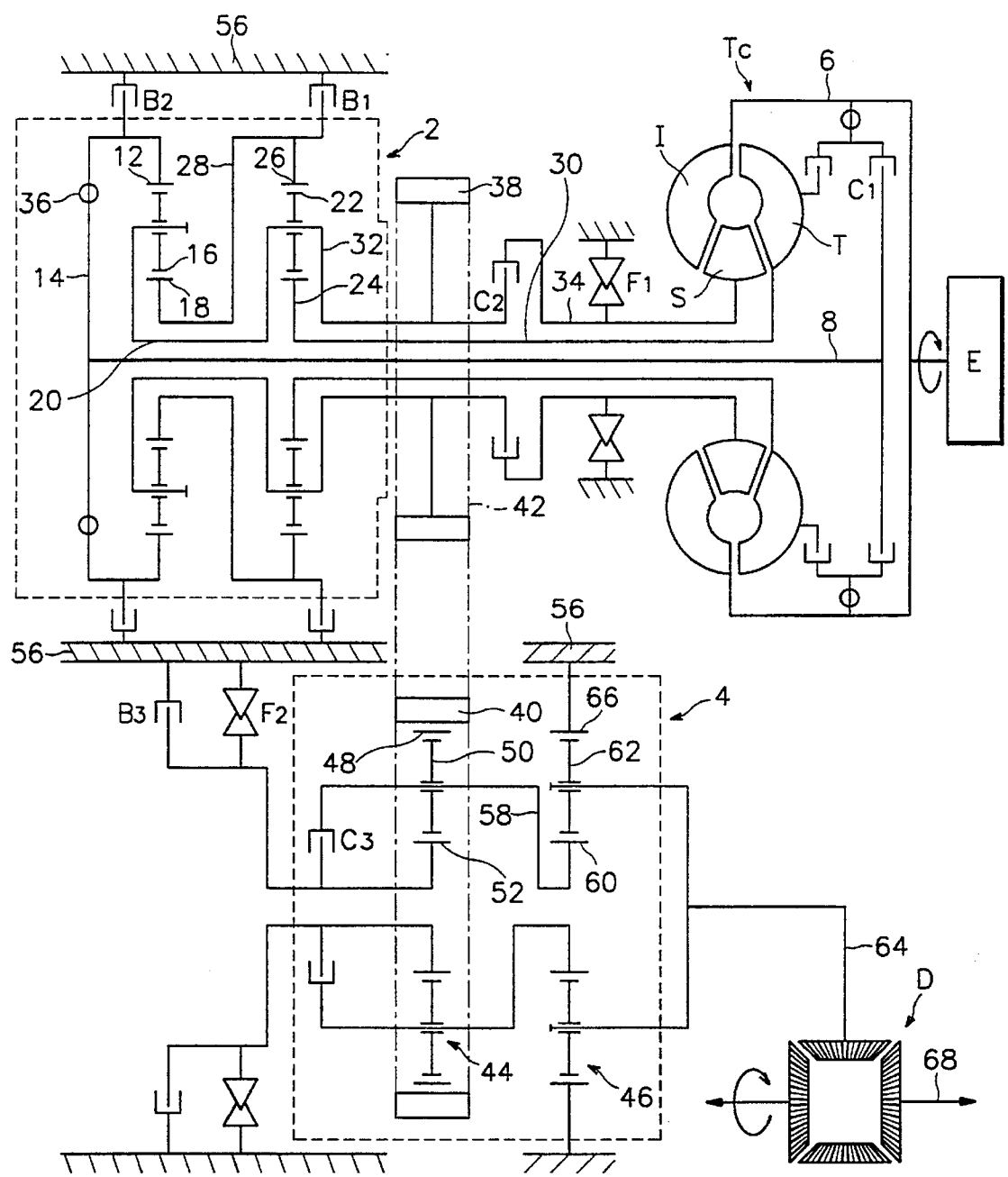
FIG. 1 is a schematic diagram illustrating the power train of an automatic transmission according to a first embodiment of the present invention.

Referring to FIG. 1, the power train of an automatic transmission according to a first embodiment of the present invention comprises a torque converter TC driven by an engine E, a first shift part 2 of a planetary gear unit for transforming the torque of the torque converter by suitable gear ratios, and a second shift part 4 of a planetary gear unit for additionally reducing the gear ratios of the first shift part 2. The torque converter TC includes an impeller I directly connected with the crankshaft of the engine E, a turbine T arranged opposite to the impeller driven by oil, and a stator S disposed between the impeller I and the turbine T for changing the flow direction of the oil to assist the impeller rotation. The torque converter TC may have the same structure as that disclosed in U.S. Pat. No. 3,613,479.

A shell cover 6 connects the impeller I with the engine E, including a friction element C1 for directly transferring the engine power to a first shaft 8 (input shaft). The first shaft 8 is connected via a hub 14 with a first ring gear 12 of the first shift part 2. The inside surface of the first ring gear 12 is engaged with a plurality of first pinion gears 16 which in turn are engaged with a first sun gear 18 arranged among them. The first pinion gears 16 are operatively connected via a first power transfer member 20 to a plurality of second pinion gears 22, which in turn are engaged with a second sun gear 24. The second pinion gears 22 are engaged with the inside surface of a second ring gear 26 which is operatively connected via a second power transfer member 28 with the first sun gear 18. A second friction element B1 is provided to selectively lock the second power transfer member 28 so as to make the first sun gear 18 and second ring gear 26 serve as reaction elements. The hub 14 is selectively locked by a third friction element B2 to make the first ring gear 12 serve as a reaction element, so that when, the second sun gear 24 serves as an input element, the first power transfer member 20 is rotated counterclockwise in reference to the engine, i.e., in the direction opposite to that of the input, so as to reverse move the vehicle.

The second sun gear 24 is connected via a third power transfer member 30 with the turbine T. The first power transfer member 20 connecting the first and second pinion gears 16 and 22 is connected via a fourth power transfer member 32 with the stator S of the torque converter. In order to selectively receive the torque of the stator S, the fourth power transfer member 32 is provided with a fourth friction element C2 to connect with a fifth power transfer member 34 that is directly connected with the stator S. The fifth power transfer member 34 is provided with a first one-way clutch F1 to prevent the stator S from rotating counterclockwise in reference to the engine. It is preferable to provide a damper 36 between the hub 14 and first ring gear 12 in order to reduce the shock occurring when the first friction element C1 is worked to connect the first shaft 8 with the engine.

A transfer drive sprocket wheel 38 is mounted on the fourth power transfer member 32 to transfer a reduced speed via a chain 42 to a transfer driven sprocket wheel 40 for transferring the motion to the second shift part 4, which consists of a third simple planetary gear unit 44 for receiving the motion of the transfer drive sprocket wheel 38 whose motion in turn is transferred to a fourth simple planetary gear unit 46. The third simple planetary gear unit 44 includes a third ring gear 48 operatively connected with the transfer driven sprocket wheel 40 and chain 42, a plurality of third pinion gears 50 engaged with the inside of the third ring gear 48, and a third sun gear 52 engaged with the third pinion gears among them. The third sun gear 52 is designed to be locked by a fifth friction element C3 to rotate integrally with the third pinion gears 50, and by a sixth friction element B3 mounted on the transmission housing 56 to selectively serve as a reaction element. In addition, a second one-way clutch F2 is provided on the transmission housing 56 to prevent the third sun gear 52 from rotating counterclockwise in reference to the engine, so that the third sun gear 52 is rotated in the same direction as that of the engine.

The third planetary carrier 58 for carrying the third pinion gears 50 is designed to transfer the torque to a fourth sun gear 60 of the fourth simple planetary gear unit 46. The periphery of the fourth sun gear 60 is engaged with the fourth pinion gears 62 which are carried by a fourth planetary carrier 64 operatively connected to a differential gear D. Further, the fourth pinion gears 62 are engaged with the inside of a fourth ring gear 66 fixedly mounted on the transmission housing 56. The fourth planetary unit 46 produces the final gear ratio to the differential gear D to rotate the vehicle axle 68.

Thus, working the engine causes the impeller I of the torque converter TC which is connected via the shell cover 6 with the output shaft of the engine, to rotate ejecting the oil in the torque converter towards the turbine. Then, the rotational force of the turbine is transferred via the third power transfer member 30 to the second sun gear 24 of the first shift part 2. In this case, the stator S of the torque converter TC is prevented from rotating in a direction opposite to that of the engine by working of the first one-way clutch F1, thus enhancing the torque of the torque converter. The torque of the turbine T is transferred via the third power transfer member 30 to the second sun gear 24 to rotate the second pinion gears 22 counterclockwise when viewed from the engine side. However, in "N" and "P" ranges as shown in FIG. 6, no element works so that the engine power is not outputted.

Setting the shift lever (not shown) to the forward "D" range, the transmission control unit makes the second friction element B1 of the first shift part 2 work so as to lock the first sun gear 18 and the second ring gear 26 of the first gear unit 2. Then, the second sun gear 24 serves as an input element and the second ring gear 26 as a reaction element, so that the fourth power transfer member 32 serves as an output element.

Figure 4:
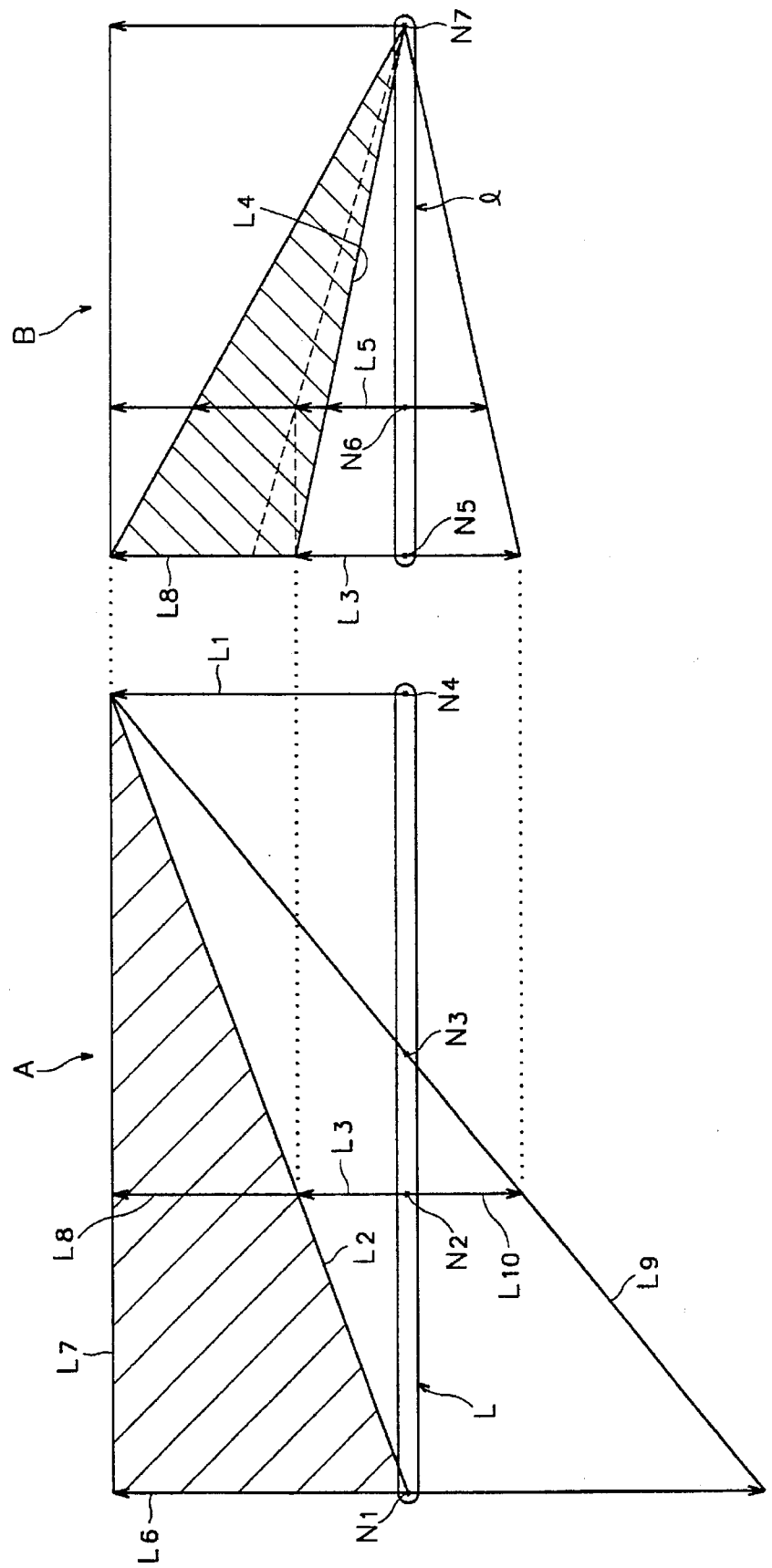
FIG. 4 is a graph schematically describing the speed rates of the inventive automatic transmission by means of lever analogy.

The gear ratios may be described in lever analogy as shown in FIG. 4. It is assumed that the left end of a lever L is the first node N1 consisting of the first sun gear 18 and the second ring gear 26, a first adjacent point the second node N2 of the first and fourth power transfer members 20 and 32, a second adjacent point the third node N3 of the first ring gear 12, and the right end the fourth node N4 of the second sun gear 24. Thus, the fourth node N4 becomes the input point and the first node N1 the fixed point. Then, a straight line L1 of an arbitrary length is drawn vertically from the fourth node N4 to represent the amount of the input speed. Next a connecting line L2 is drawn connecting the upper end of the input speed line L1 with the first node N1. Now, for example, if there is drawn the shortest line L3 between the second node N2 and the connecting line L2, the line L3 becomes the output speed line at the second node N2. Hence, the gear ratio may be expressed by the fraction of input speed line / output speed line (L1/L3), which is regarded as the first speed gear ratio.

The first speed gear ratio is transferred via the fourth power transfer member 32 to the transfer drive sprocket wheel 38, which in turn transfers the motion via the chain 42 to the transfer driven sprocket wheel 40 and thus to the second shift part 4. Then, the transferred speed is again transferred via the third simple planetary gear unit 44 to the fourth sun gear 60 of the fourth simple planetary gear unit 46, finally reduced by the reaction of the fourth ring gear 66. The finally reduced speed is produced through the fourth planetary carrier 64.

Likewise, the gear ratios of the third simple planetary gear unit may be also described in lever analogy represented by reference symbol "1" in the right side of FIG. 4. In this case, it is assumed that the left end of the lever "1" is the fifth node N5 consisting of the third ring gear 48, the first adjacent point the sixth node N6 of the third planetary carrier 58, and the right end the seventh node N7 of the third sun gear 52. The torque of the first shift part 2 is inputted to the fifth node N5 assumed to have as its magnitude the length of a line L3 arbitrarily drawn vertically from the fifth node N5. The line L4 connecting the upper end of the line L3 with the seventh node N7 depicts the reduction rate of the output, so that the shortest line L5 from the sixth node N6 to the line L4 represents the output speed of the third simple planetary gear unit 44 which is again reduced via the fourth simple planetary gear unit 46 finally transferred via the fourth planetary carrier 64 to the differential gear D. Then, the driving axle 68 of the vehicle is rotated.

In the first speed, the final gear ratio is achieved by going sequentially through the multiple stages of the first shift part 2, the transfer drive and driven sprocket wheels, and the second shift part 4. In this case, although the third sun gear 52 is locked in one direction by working of the second one-way clutch F2, the engine brake is not held when coasting, and therefore the sixth friction element B3 is manually worked to hold the engine brake. When the speed of the stator S reaches a predetermined value or the torque converter TC gets to the coupling condition, the transmission control unit works the fourth friction element C2 so as to directly connect the stator S with the fourth power transfer member 32. Since the torque of the stator S is added to the first speed of the fourth power transfer member 32, the rotational speed of the transfer drive sprocket wheel 38 is increased more than the first speed. Thus, the torque of the turbine T is reduced by the amount transferred from the stator S to the transfer drive sprocket wheel 38 decreasing the total output torque.

Figure 2:
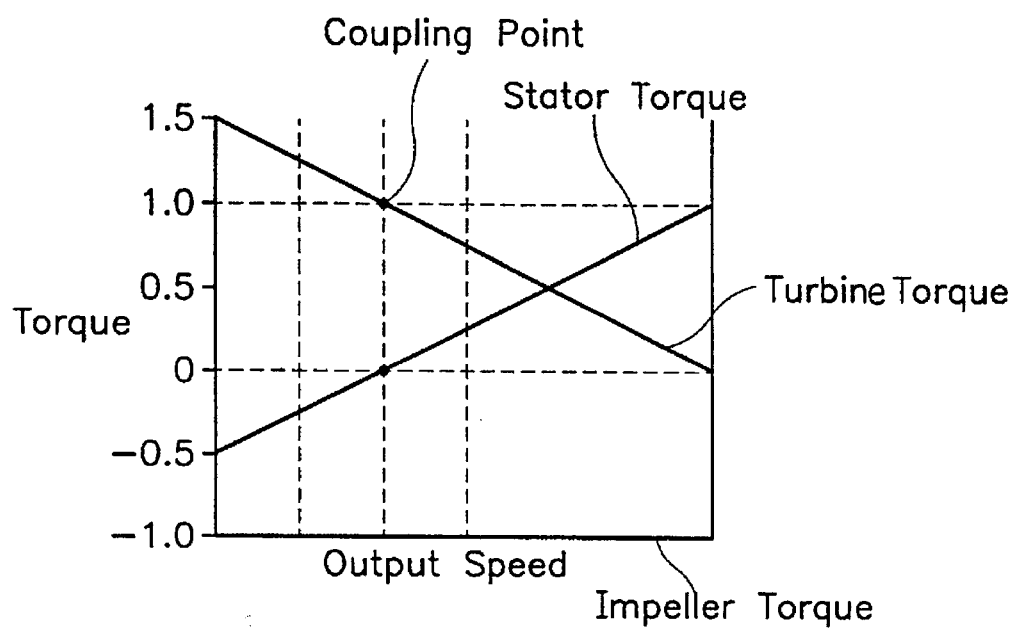
FIG. 2 is a graph illustrating the relationships between the torques of the turbine and stator and the output speed at automatic continuous shifting mode in an automatic transmission of FIG., 1.
Figure 3:
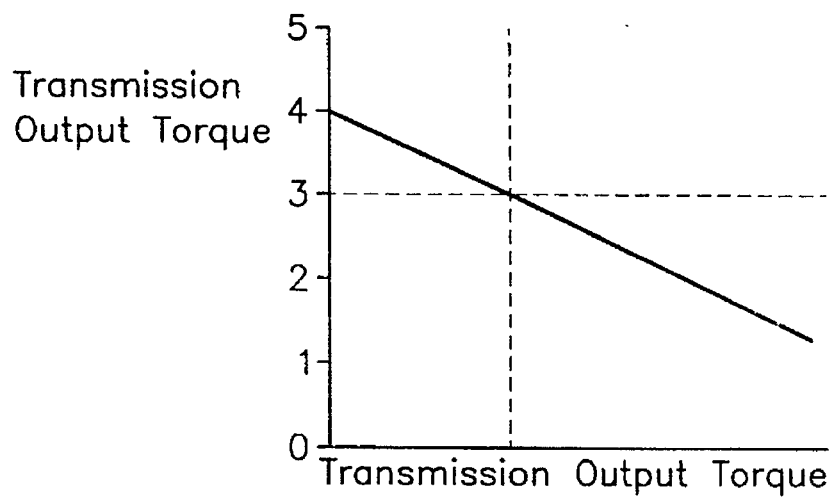
FIG. 3 is a graph illustrating the relationship between the output torque of the inventive automatic transmission and the output speed at automatic continuous shifting mode.

This represents a continuous shifting condition before making the upshift toward the second speed, where the relationship between the output speed and the torque is illustrated in FIGS. 2 and 3. The continuous shifting operation begins just when the torque of the stator S is transferred to the transfer drive sprocket wheel 38. In this case, the torque of the impeller is maintained constant, but the torque of the turbine is decreased while increasing the torque of the stator. As the output speed is increased, the rate of the transmission torque is decreased, so that the shifting operation is continuously performed until the torque converter resumes the coupling condition, where the shift ratio is automatically determined according to the vehicle load. A small vehicle load causes the torque converter to get to the coupling condition in a relatively short period of time thus shortening the time for directly connecting the stator S with the fourth power transfer member 38, while a large vehicle load causes the torque converter to get to the coupling condition in a relatively long period of time thus making it longer to operate in the low speed region.

In such shifting mode, when the fourth friction element C2 is released to cut off the torque from the stator S to the fourth power transfer member 32, the shifting is immediately carried out to the first speed mode to increase the torque thus resulting in a large kickdown. On the other hand, keeping the stator S connected with the fourth power transfer member 38 causes the stator to receive a reverse torque as in stalling, so that the speed of the stator S is decreased and the torque of the turbine T increased thus resulting in the increase of the total torque to obtain a small kickdown. At this point, there occurs no shifting shock, but the shock impulses that may occur when connecting or disconnecting the stator with the fourth power transfer member 32 by means of the fourth friction element C2 are absorbed by the torque converter TC serving as a damper because the stator S is contained in the torque converter TC. In this case, the final gear ratio is achieved by going sequentially through the multiple stages of the first shift part 2, the transfer drive and driven sprocket wheels, and the second shift part 4. Of course, no engine brake is held when coasting.

In this automatic continuous shifting mode, if the speed of the stator S reaches a predetermined value or the torque converter TC gets to the coupling condition with increase of the vehicle speed, the transmission control unit releases the second friction element B1 and works the first friction element Cl. Thus, the engine output is transferred via the first friction element C1 to the first shaft 8 to the first ring gear 12 of the compound planetary gear unit 2 and via the third power transfer member 30 to the second sun gear 24. As a result the compound planetary gear unit 2 receives power from the two input elements.

Hence, as shown in FIG. 4, the first and fourth nodes N1 and N4 of the first shift part 2 serve as the input terminal, and therefore the output speed of the first shift part 2 may be represented by the straight line L8 vertically drawn from the second node N2 to the line L7 connecting the upper ends of the input speed lines L1 and L6. Consequently, the compound planetary gear unit 2 is directly connected with the engine so as to produce the second speed gear ratio, where the second shift part 4 carries out a speed reduction as in the first speed. Namely, the first friction element Cl makes the compound planetary gear unit 2 directly connected with the engine thereby producing a high power transfer efficiency while, since the first friction element C1 is not worked, the stator S idles resulting in the zero loss of the torque converter TC. This shift is carried out when there is almost no or a very little difference between the speeds of the turbine T and the third ring gear 48 and the speed of the engine, thus minimizing the shift shock impulses. Of course, the vibrations that may be transferred to the hub 14 are absorbed by the damper 36. The final gear ratio in the second speed is achieved by going sequentially through the multiple stages of the direct connection of the first shift part 2 and the engine, the transfer drive and driven sprocket wheels, and the second shift part 4.

As the vehicle speed is increased, the transmission control unit additionally works the fourth friction element C2 of the first shift part 2 and the fifth friction element C3 of the second shift part 4, so that the first and second shift parts are directly connected with the engine to produce the third speed gear ratio. Hence, the output speed of the first shift part 2 may be represented by the line L8 outputted via the second shift part 4 without any modification. In this case, the engine is directly connected with the torque converter together with all the elements of the first and second shift parts 2 and 4, and therefore the optimum power transfer efficiency is secured and engine braking occurs when coasting. Further, the shift shock impulses occur very low due to the low engine torque.

Figure 5:
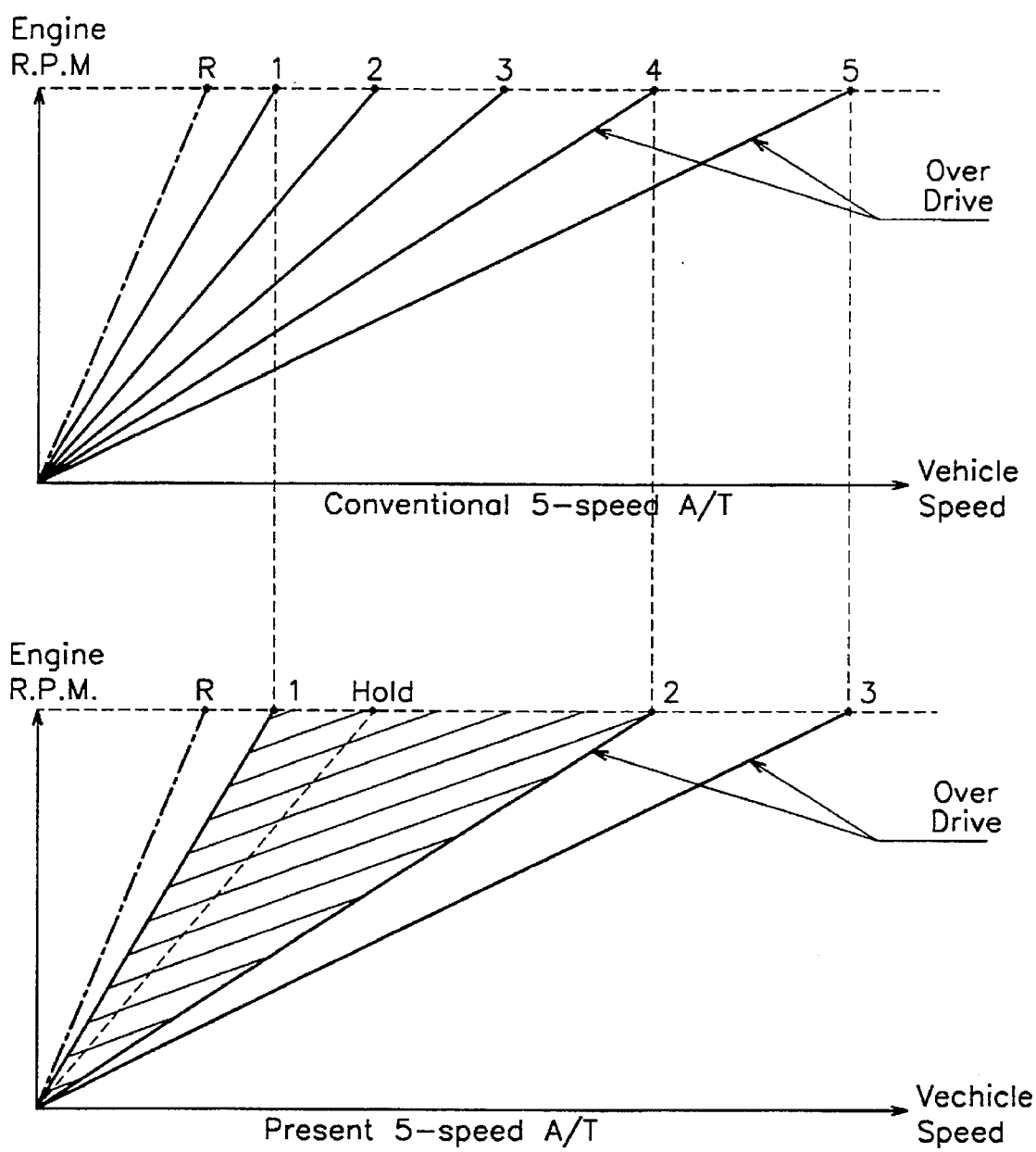
FIG. 5 is a graph comparing the distribution of the gear ratios of the inventive automatic transmission with that of a conventional five-speed automatic transmission.

As shown in FIG. 6, engine braking occurs in range "III" when coasting because the fourth and sixth friction elements C2 and B3 are worked. Likewise, in the range "II" of the automatic continuous shifting mode, engine braking occurs because of the working of the fourth and sixth friction elements C2 and B3. Additionally, in range "L", engine braking occurs because the second and fourth friction elements B1 and B3 are worked to lock the first sun gear 18. Hereinbefore described is the shifting procedure when moving forward. As shown in FIG. 5, the inventive automatic transmission has the same first speed gear ratio as that of a conventional automatic five-speed transmission, and performs the continuous automatic gear shifting to the fourth speed gear ratio, thereby obviating the shift shock impulses in the low speed region where there may occur serious shift shock impulses.

Setting the shift lever to the reverse range "R", the transmission control unit works the third friction element B2 of the first shift part 2 and the sixth friction element B3 of the second shift part 4, so that the second sun gear 24 of the compound planetary gear unit 2 serves as the input element, the first ring gear 12 as a reaction element, and the fourth power transfer member 32 as the output element. Then, as shown in FIG. 4, the reverse moving gear ratio may be represented by the straight line L10 vertically drawn from the second node N2 to the straight line L9 connecting the upper end of the input speed line L1 and the third node N3. The first shift part 2 reduces engine output speed according to the reverse moving gear ratio, and the output of the first shift part 2 is transferred via the transfer drive and driven sprocket wheels 38 and 40 to the second shift part 4. The second shift part 4 reduces the output of the first shift part 2 through the third simple planetary gear unit and the fourth ring gear 66, and finally transfer this output to the differential gear D.

When there is needed the second speed hold, for example, the drive wheels slip on slippery roads, the transmission control unit works the second and fifth friction elements B1 and C3 to make (1) the first shift part 2 carry out a gear shift to the first speed and (2) the second shift part 4 connected directly with the engine. Consequently different gear ratios between the first and second speeds in the second shift part 4 are formed as shown by dotted lines in FIG. 4. This speed mode makes engine braking occur when coasting, and may also be employed when setting the shift lever to range "II". The friction elements are selectively combined according to the shift ratios, as shown in the table of FIG. 6, where the small circle indicates the selection of the elements.

As described above, the advantages of the inventive automatic transmission are summarized as follows:

1) The gear shift is automatically and continuously carried out especially in the low speed region where the operation time is short and the shift shock impulses occur greatly, thus improving the shift operation.

2) In the high speed region where the shift shock impulses are ignorable but which requires a high power transfer efficiency, the shift mechanism is directly connected with the engine maximizing the fuel efficiency.

3) The number of the friction elements and one-way clutches is reduced compared to the conventional automatic transmission but improves the operation, thus reducing the production cost and the weight.

Figure 7:
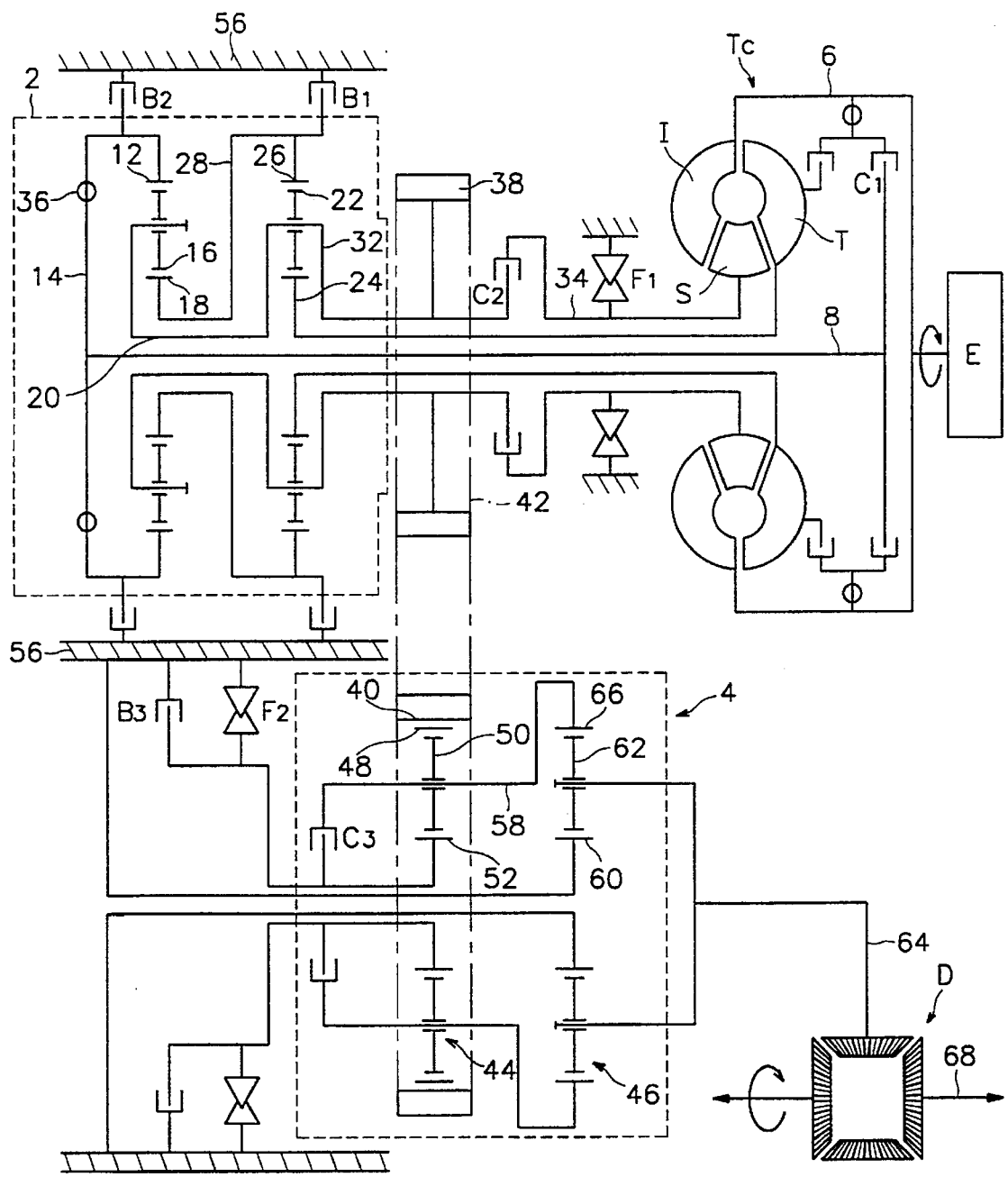
FIG. 7 is a diagram schematically illustrating the power train of an automatic transmission according to a second embodiment of the present invention.

Another embodiment of the present invention as shown in FIG. 7 illustrates a slightly different structure in the second shift part 4, but the first shift part 2 has the same structure as in FIG. 1. Namely, the difference between both embodiments is that one end of the third planetary carrier 58 is connected with the fourth ring gear 66 and the fourth sun gear 60 fixedly attached to the transmission housing 56. The shift operation is the same as that in the first embodiment. The first speed operation is continuously carried out. The second one-way clutch F2 grips the third sun gear 52 in the second speed, while the fifth friction element C3 is worked to wholly rotate the first simple planetary gear unit 44 in the third speed. In the reverse moving, the sixth friction element B3 is worked to prevent the first sun gear 52 from rotating in the same direction as the engine, so that the first sun gear serves as the reaction element thus reducing the speed.

Figure 8:
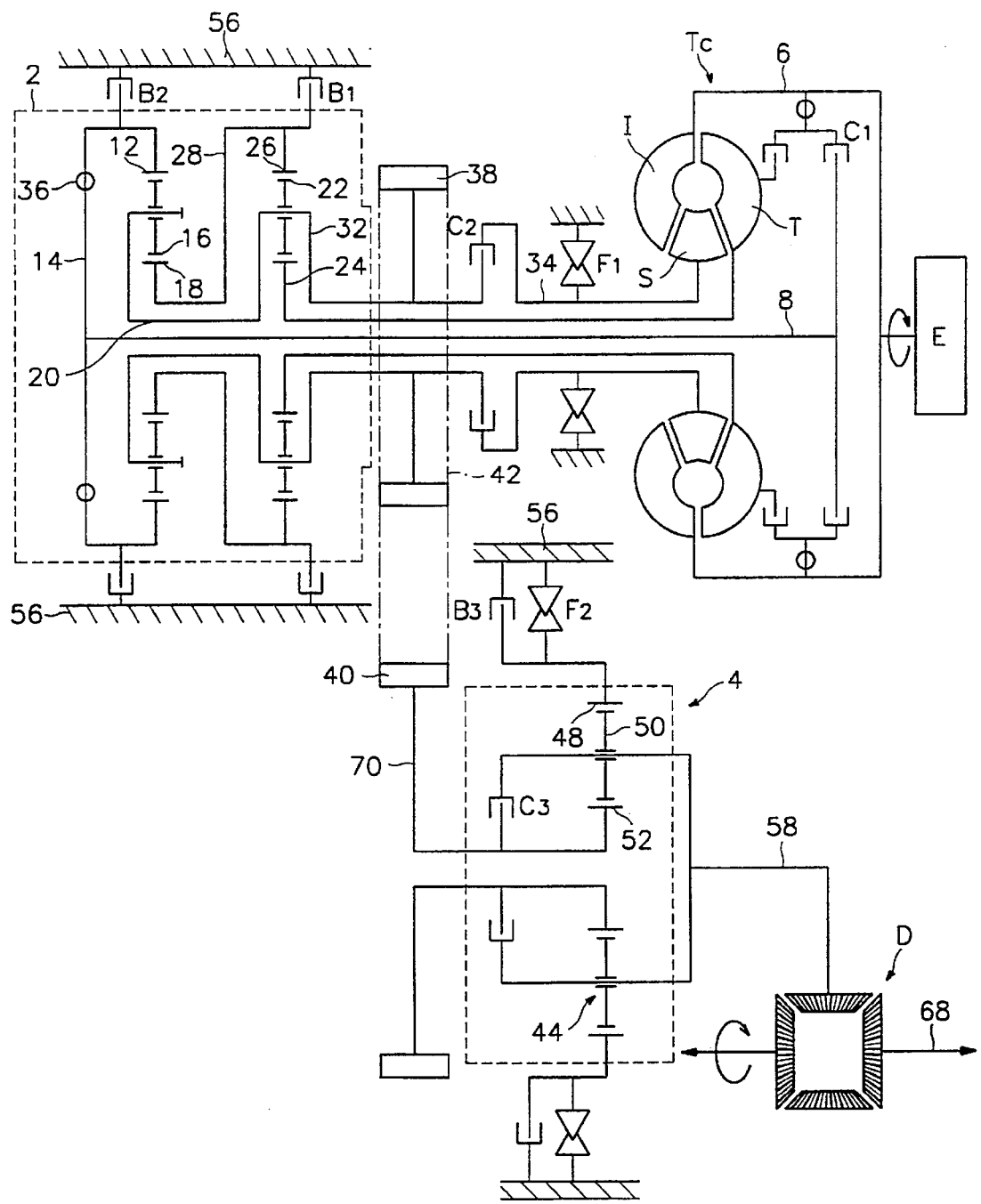
FIG. 8 is a diagram schematically illustrating the power train of an automatic transmission according to a third embodiment of the present invention.

Referring to FIG. 8, a third embodiment of the present invention shows a second shift part 4 consisting of a single simple planetary gear unit. There is omitted a kind of the fourth simple planetary gear unit included in the previous two embodiments. Namely, the third sun gear 52 is connected via a sixth power transfer member 70 with the transfer driven sprocket wheel 40. The third pinion gears 50 are commonly engaged with the periphery of the third sun gear 52 among them, carried by the third planetary carrier 58, whose one end is connected via the fifth friction element C3 with the sixth power transfer member 70 and the other end with the differential gear D. The third ring gear 48 surrounding and internally engaged with the third pinion gears 50 selectively serves as a reaction element by working the sixth friction element B3 prevented from rotating counterclockwise in reference to the engine by working of the second one-way clutch F2. The present embodiment also performs the same shifting operation as the previous embodiment.

Figure 9:
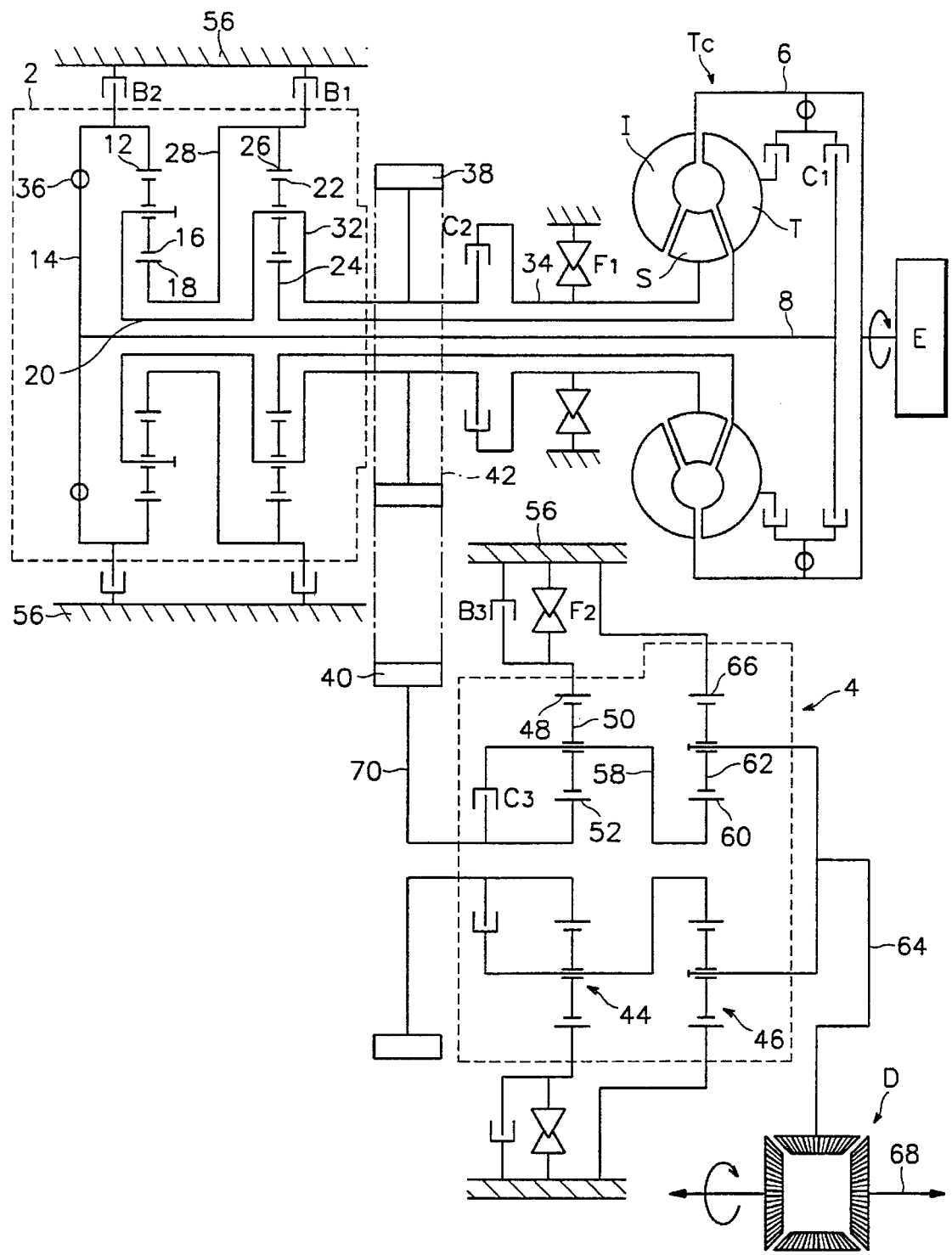
FIG. 9 is a diagram schematically illustrating the power train of an automatic transmission according to a fourth embodiment of the present invention.

A fourth embodiment of the present invention, as shown in FIG. 9, consists of the first shift part 2 having the same structure as the first embodiment, and the second shift part 4 having the third simple planetary gear unit 44 as shown in FIG. 8 connected to the fourth simple planetary gear unit 46 as shown in FIG. 1 second embodiments. The third simple planetary gear unit 44, as in the case of the third embodiment, has the third sun gear 52 connected via the sixth power transfer member 70 with the transfer driven sprocket wheel 40. The third pinion gears 50 are commonly engaged with the periphery of the third sun gear 52 among them, carried by the third planetary carrier 58, whose one end is connected via the fifth friction element C3 with the sixth power transfer member 70. The third ring gear 48 surrounding and internally engaged with the third pinion gears 50 selectively serves as a reaction element by working the sixth friction element B3 mounted on the transmission housing 56 prevented from rotating counterclockwise in reference to the engine by working of the second one-way clutch F2. Additionally, the other end of the third planetary carrier 58 is connected with the fourth sun gear 60, whose periphery is commonly engaged with the fourth pinion gears 62 carried by the fourth planetary carrier 64, which transfers the final gear ratio to the differential gear D. The fourth ring gear 66 surrounding and internally engaged with the fourth pinion gears 62 is fixedly mounted on the transmission housing 56 to serve as a reaction element.

Figure 10:
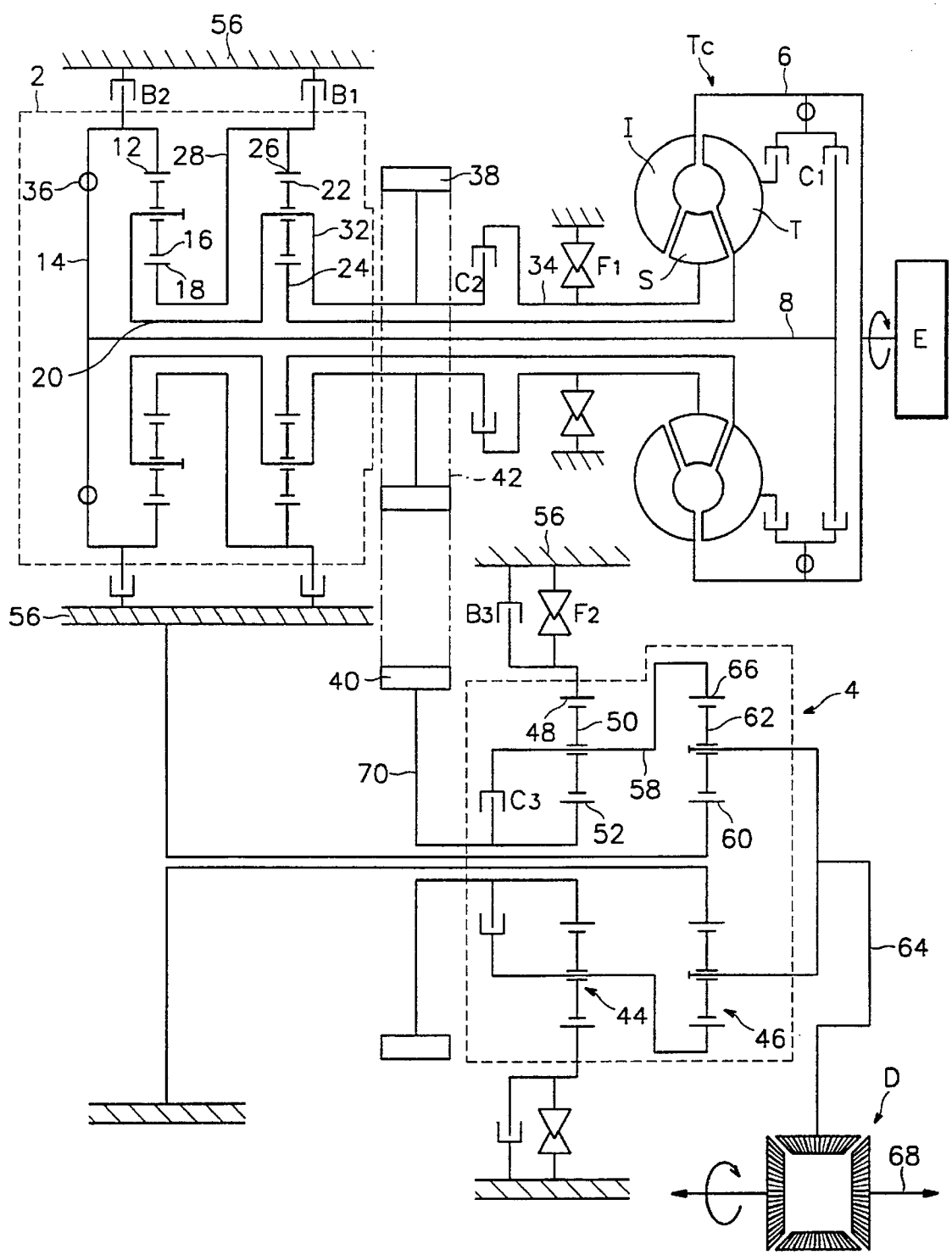
FIG. 10 is a diagram schematically illustrating the power train of an automatic transmission according to a fifth embodiment of the present invention.

The fifth embodiment of the present invention, as shown in FIG. 10, has a second shift part 4 consisting of two simple planetary gear units as in the fourth embodiment. The difference between the fourth and fifth embodiments is in that the third planetary carrier 58 is connected with the fourth ring gear 66 to serve as the input element of the fourth simple planetary gear unit 46 while connecting the fourth sun gear 60 with the transmission housing 56 to serve as a reaction element. The present embodiment also performs the same shifting operation as the previous embodiment.

What is claimed is:

1. A power train of an automatic transmission for a vehicle comprising:

a torque converter for changing a torque speed of power from an engine;

a first shift part operationally connected to said torque converter, said first shift part including a compound planetary gear unit with first and second simple planetary gear units mounted on an input shaft for carrying out a first shift operation, said first simple planetary gear unit including a first sun gear surrounded by and engaged with a plurality of first pinion gears carried by a first planetary carrier, a first ring gear surrounding and internally engaged with said first pinion gears, and said second simple planetary gear unit including a second sun gear surrounded by and engaged with a plurality of second pinion gears carried by a second planetary carrier, and a second ring gear surrounding and internally engaged with said second pinion gears;

a second shift part operationally connected to said first shift part, said second shift part including third and fourth simple planetary gear units, operationally connected to one another, for carrying out a second shift operation, said third simple planetary gear unit including a third sun gear surrounded by and engaged with a plurality of third pinion gears carried by a third planetary carrier, and a third ring gear surrounding and internally engaged with said third pinion gears, and said fourth simple planetary gear unit including a fourth sun gear surrounded by and engaged with a plurality of fourth pinion gears carried by a fourth planetary carrier, and a fourth ring gear surrounding and internally engaged with said fourth pinion gears; and a differential gear for transferring output of said second shift part to a vehicle axle.

2. A power train of an automatic transmission as defined in claim 1, further comprising:

a friction element selectively connecting said second simple planetary gear unit with a stator of said torque converter so that torque of said stator is transferred to said second shift part.

3. The power train of an automatic transmission as defined in claim 2, wherein said friction element selectively connects said stator and said second planetary carrier.

4. A power train of an automatic transmission as defined in claim 1, further comprising:

a friction element selectively connecting said third planetary carrier with said third sun gear.

5. A power train of an automatic transmission as defined in claim 1, further comprising:

a friction element to selectively lock said third ring gear to serve as a reaction element.

6. A power train of an automatic transmission as defined in claim 1, wherein said second sun gear is operatively connected with a turbine of said torque converter and said second ring gear is selectively locked by a friction element to make said second sun gear deliver a forward first speed.

7. The power train of an automatic transmission as defined in claim 1, wherein said third sun gear receives output of said first transmission part.

8. The power train of an automatic transmission as defined in claim 7, further comprising:

a one way clutch connected to said third ring gear which prevents said third ring gear from rotating in a direction opposite to a rotational direction of said engine.

9. The power train of an automatic transmission as defined in claim 7, wherein said fourth sun gear is connected to said third planetary carrier.

10. The power train of an automatic transmission as defined in claim 7, wherein said fourth ring gear is connected to said third planetary carrier.

11. The power train of an automatic transmission as defined in claim 1, further comprising:

a hub connected to said first ring gear; and a friction element selectively connecting said hub to said torque converter; and wherein said second sun gear is connected to said torque converter.

12. The power train of an automatic transmission as defined in claim 11, further comprising:

dampening means connected to said hub for dampening vibrations transmitted thereto via said torque converter.

13. The power train of an automatic transmission as defined in claim 1, further comprising:

a first friction element selectively locking said first ring gear to a housing of said transmission so that said first ring gear serves as one of an input element and a reaction element.

14. The power train of an automatic transmission as defined in claim 1, further comprising:

a first friction element selectively locking said second ring gear to a housing of said transmission so that said first ring gear selectively serves as a reaction element, and wherein said second ring gear is connected to said first sun gear.

15. The power train of an automatic transmission as defined in claim 1, further comprising:

a first power transmitting member connecting said first and second planetary carrier.

16. The power train of an automatic transmission as defined in claim 1, wherein said third ring gear receives output of said first transmission part.

17. The power train of an automatic transmission as defined in claim 16, further comprising:

a one way clutch connected to said third sun gear which prevents said third sun gear from rotating in a direction opposite to a rotational direction of said engine.

18. The power train of an automatic transmission as defined in claim 16, further comprising:

a first friction element selectively locking said third sun gear to serve as a reaction element.

19. The power train of an automatic transmission as defined in claim 16, wherein said fourth sun gear is connected to said third planetary carrier.

20. The power train of an automatic transmission as defined in claim 16, wherein said fourth ring gear is connected to said third planetary carrier.

21. The power train of an automatic transmission as defined in claim 16, further comprising:

a first friction element selectively locking said third ring gear to serve as a reaction element.

22. The power train of an automatic transmission as defined in claim 1, further comprising:

a friction element connecting two elements of said third simple planetary gear unit.

23. A power train of an automatic transmission for a vehicle comprising:

a torque converter for changing torque speed of power of an engine;

a first shift part operationally connected to said torque converter, said first shift part including a compound planetary gear unit with first and second simple planetary gear units mounted on an input shaft for carrying out a first shift operation, said first simple planetary gear unit including a first sun gear surrounded by and engaged with a plurality of first pinion gears carried by a first planetary carrier, a first ring gear surrounding and internally engaged with said first pinion gears, and said second simple planetary gear unit including a second sun gear surrounded by and engaged with a plurality of second pinion gears carried by a second planetary carrier, and a second ring gear surrounding and internally engaged with said second pinion gears;

a second shift part operationally connected to said first shift part, said second shift part including third and fourth simple planetary gear units, operationally connected to one another, for carrying out a second shift operation, said third simple planetary gear unit including a third sun gear surrounded by and engaged with a plurality of third pinion gears carried by a third planetary carrier, and a third ring gear surrounding and internally engaged with said third pinion gears, and said fourth simple planetary gear unit including a fourth sun gear surrounded by and engaged with a plurality of fourth pinion gears carried by a fourth planetary carrier, and a fourth ring gear surrounding and internally engaged with said fourth pinion gears;

a differential gear for transferring output of said second shift part to a vehicle axle; and wherein said third simple planetary gear unit one of reduces and simply transfers output of said first shift part; and said fourth planetary gear unit makes said third planetary carrier rotate in the same direction as said engine and reduces output of said third simple planetary gear unit.

24. A power train of an automatic transmission as defined in claim 23, wherein said first and second shift parts have separate shafts.

25. A power train of an automatic transmission for a vehicle comprising:

a torque converter for changing torque speed of power from an engine;

a first shift part operationally connected to said torque converter, said first shift part including a compound planetary gear unit with first and second simple planetary gear units mounted on an input shaft for carrying out a first shift operation, said first simple planetary gear unit including a first sun gear surrounded by and engaged with a plurality of first pinion gears carried by a first planetary carrier, a first ring gear surrounding and internally engaged with said first pinion gears, and said second simple planetary gear unit including a second sun gear surrounded by and engaged with a plurality of second pinion gears carried by a second planetary carrier, and a second ring gear surrounding and internally engaged with said second pinion gears;

a second shift part operationally connected to said first shift part, said second shift part including third and fourth simple planetary gear units, operationally connected to one another, for carrying out a second shift operation, said third simple planetary gear unit including a third sun gear surrounded by and engaged with a plurality of third pinion gears carried by a third planetary carrier, and a third ring gear surrounding and internally engaged with said third pinion gears, and said fourth simple planetary gear unit including a fourth sun gear surrounded by and engaged with a plurality of fourth pinion gears carried by a fourth planetary carrier, and a fourth ring gear surrounding and internally engaged with said fourth pinion gears;

a differential gear for transferring the output of said second shift part to a vehicle axle; wherein said third ring gear receives output of said first shift part;

said third sun gear rotates integrally with said first pinion gears by selective operation of a first friction element, said third sun is selectively locked by a second friction element to serve as a reaction element, and said third sun gear is connected with a one-way clutch so as not to rotate in a same direction as said engine; and said fourth sun gear receives output of said third planetary carrier.

26. A power train of an automatic transmission for a vehicle comprising:

a torque converter for changing torque speed of power from an engine;

a first shift part operationally connected to said torque converter, said first shift part including a compound planetary gear unit with first and second simple planetary gear units mounted on an input shaft for carrying out a first shift operation, said first simple planetary gear unit including a first sun gear surrounded by and engaged with a plurality of first pinion gears carried by a first planetary carrier, a first ring gear surrounding and internally engaged with said first pinion gears, and said second simple planetary gear unit including a second sun gear surrounded by and engaged with a plurality of second pinion gears carried by a second planetary carrier, and a second ring gear surrounding and internally engaged with said second pinion gears;

a second shift part operationally connected to said first shift part, said second shift part including third and fourth simple planetary gear units, operationally connected to one another, for carrying out a second shift operation, said third simple planetary gear unit including a third sun gear surrounded by and engaged with a plurality of third pinion gears carried by a third planetary carrier, and a third ring gear surrounding and internally engaged with said third pinion gears, and said fourth simple planetary gear unit including a fourth sun gear surrounded by and engaged with a plurality of fourth pinion gears carried by a fourth planetary carrier, and a fourth ring gear surrounding and internally engaged with said fourth pinion gears;

a differential gear for transferring the output of said second shift part to a vehicle axle; and wherein said third ring gear receives output of said first shift part;

said third sun gear selectively serving as a reaction element based on operation of a friction element;

said fourth ring gear being connected with said third planetary carrier; and said fourth sun gear being fixedly connected with a housing of said transmission to serve as a reaction element.

27. A power train of an automatic transmission for a vehicle comprising:

a torque converter for changing a torque speed of power from an engine;

a first shift part operationally connected to said torque converter, said first shift part including a compound planetary gear unit with first and second simple planetary gear units mounted on an input shaft for carrying out a first shift operation, said first simple planetary gear unit including a first sun gear surrounded by and engaged with a plurality of first pinion gears carried by a first planetary carrier, a first ring gear surrounding and internally engaged with said first pinion gears, and said second simple planetary gear unit including a second sun gear surrounded by and engaged with a plurality of second pinion gears carried by a second planetary carrier, and a second ring gear surrounding and internally engaged with said second pinion gears;

a second shift part operationally connected to said first shift part, said second shift part including a third simple planetary gear unit for carrying out a second shift operation, said third simple planetary gear unit including a third sun gear surrounded by and engaged with a plurality of third pinion gears carried by a third planetary carrier, and a third ring gear surrounding and internally engaged with said third pinion gears;

a differential gear for transferring the output of said second shift part to a vehicle axle; and wherein said third sun gear receives output of said first shift part; and said third ring gear selectively serves as a reaction element.

28. A power train of an automatic transmission for a vehicle comprising:

a torque converter for changing a torque speed of power from an engine;

a first shift part operationally connected to said torque converter, said first shift part including a compound planetary gear unit with first and second simple planetary gear units mounted on an input shaft for carrying out a first shift operation, said first simple planetary gear unit including a first sun gear surrounded by and engaged with a plurality of first pinion gears carried by a first planetary carrier, a first ring gear surrounding and internally engaged with said first pinion gears, and said second simple planetary gear unit including a second sun gear surrounded by and engaged with a plurality of second pinion gears carried by a second planetary carrier, and a second ring gear surrounding and internally engaged with said second pinion gears;

a second shift part operationally connected to said first shift part, said second shift part including third and fourth simple planetary gear units, operationally connected to one another, for carrying out a second shift operation, said third simple planetary gear unit including a third sun gear surrounded by and engaged with a plurality of third pinion gears carried by a third planetary carrier, and a third ring gear surrounding and internally engaged with said third pinion gears, and said fourth simple planetary gear unit including a fourth sun gear surrounded by and engaged with a plurality of fourth pinion gears carried by a fourth planetary carrier, and a fourth ring gear surrounding and internally engaged with said fourth pinion gears;

a differential gear for transferring the output of said second shift part to a vehicle axle; and wherein said third sun gear receives output of said first shift part;

said third ring gear is selectively connected with housing of said transmission by a friction element to serve as a reaction element;

said fourth sun gear is connected with said third planetary carrier; and said fourth ring gear is connected with said transmission housing to serve as a reaction element.

29. A power train of an automatic transmission for a vehicle comprising:

a torque converter for changing a torque speed of power from an engine;

a first shift part operationally connected to said torque converter, said first shift part including a compound planetary gear unit with first and second simple planetary gear units mounted on an input shaft for carrying out a first shift operation, said first simple planetary gear unit including a first sun gear surrounded by and engaged with a plurality of first pinion gears carried by a first planetary carrier, a first ring gear surrounding and internally engaged with said first pinion gears, and said second simple planetary gear unit including a second sun gear surrounded by and engaged with a plurality of second pinion gears carried by a second planetary carrier, and a second ring gear surrounding and internally engaged with said second pinion gears;

a second shift part operationally connected to said first shift part, said second shift part including third and fourth simple planetary gear units, operationally connected to one another, for carrying out a second shift operation, said third simple planetary gear unit including a third sun gear surrounded by and engaged with a plurality of third pinion gears carried by a third planetary carrier, and a third ring gear surrounding and internally engaged with said third pinion gears, and said fourth simple planetary gear unit including a fourth sun gear surrounded by and engaged with a plurality of fourth pinion gears carried by a fourth planetary carrier, and a fourth ring gear surrounding and internally engaged with said fourth pinion gears;

a differential gear for transferring the output of said second shift part to a vehicle axle; and wherein said third sun gear receives output of said first shift part;

said third ring gear is selectively connected with a housing of said transmission by a friction element to serve as a reaction element;

said fourth ring gear is connected with said third planetary carrier; and said fourth sun gear is connected with said transmission housing to serve as a reaction element.

* * * * *